Jan. 12, 1971 R. S. LINSTEAD 3,553,887
TOY VEHICLE WINDOW CONSTRUCTION
Filed Jan. 17, 1969 2 Sheets-Sheet 1
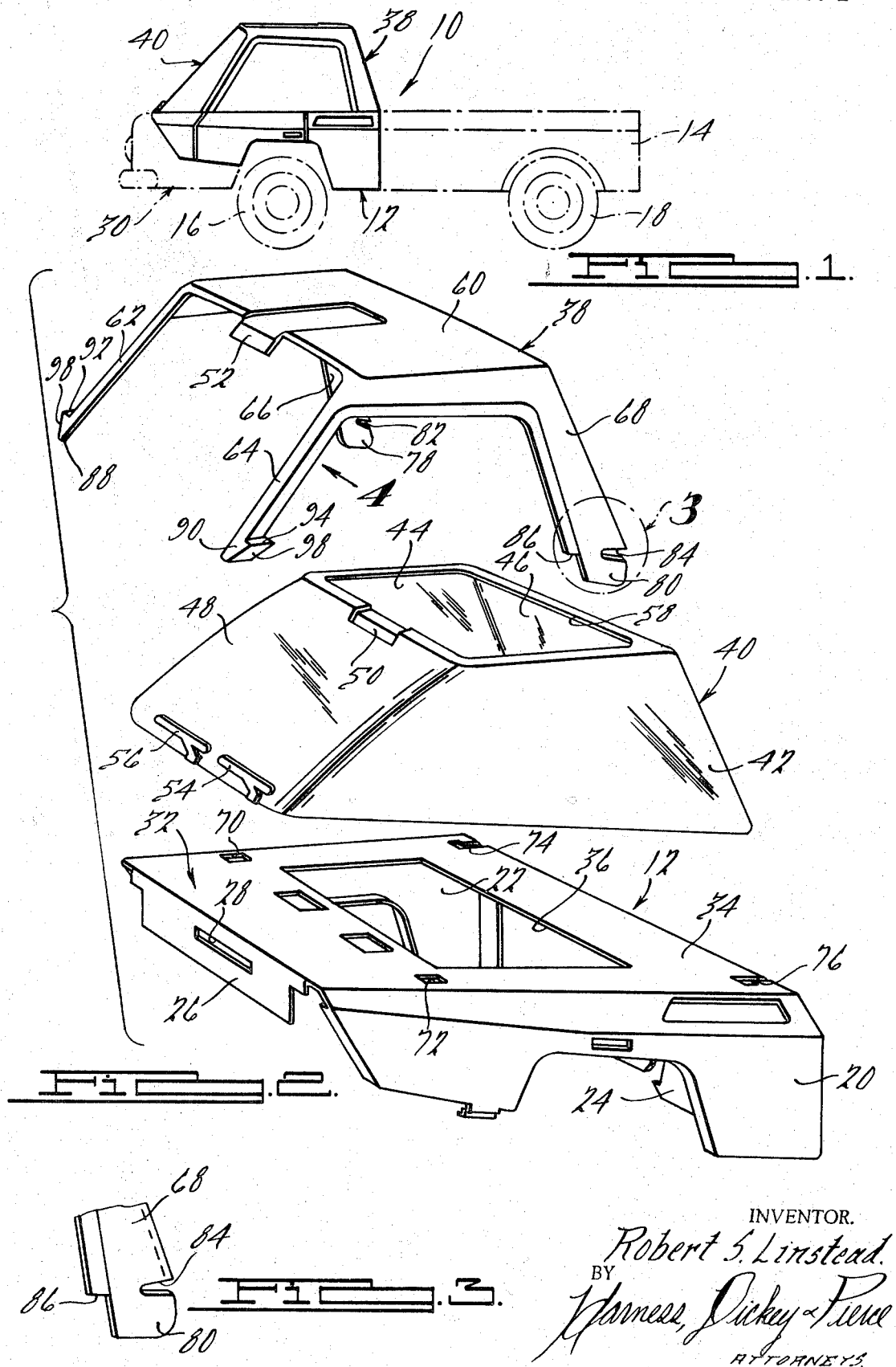
INVENTOR.
Robert S. Linstead.
BY
Harness, Dickey & Pierce
ATTORNEYS.

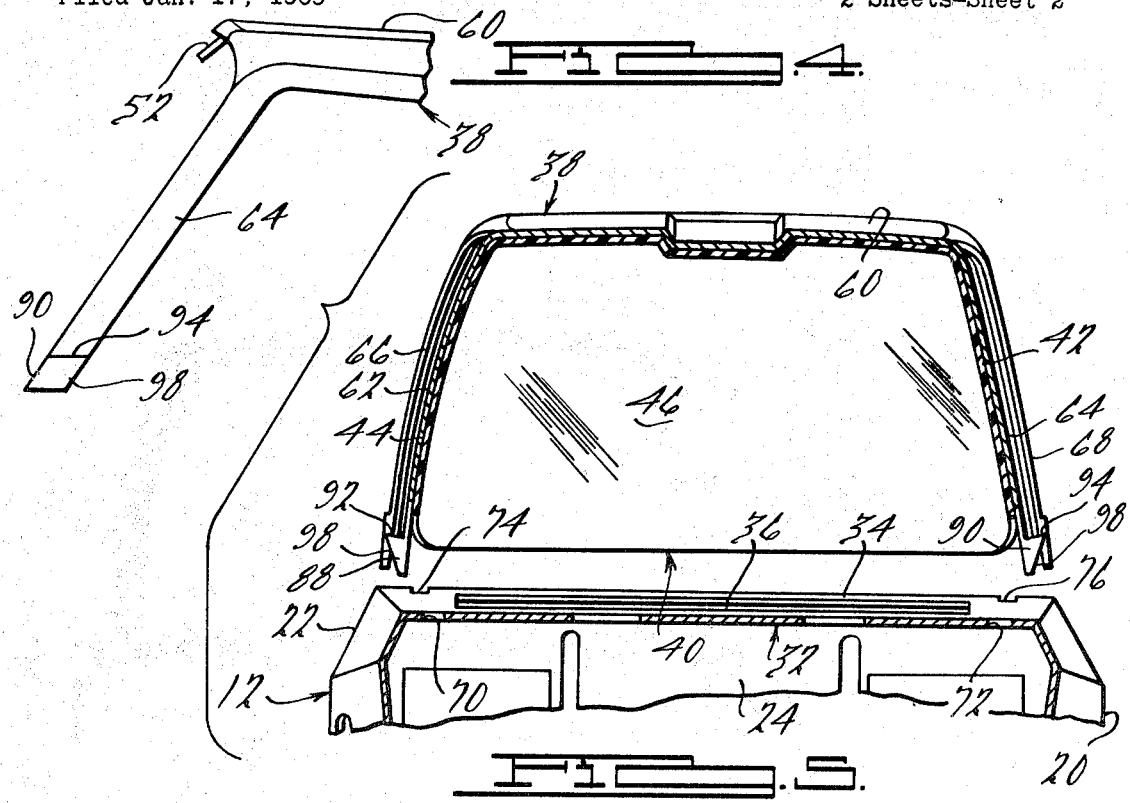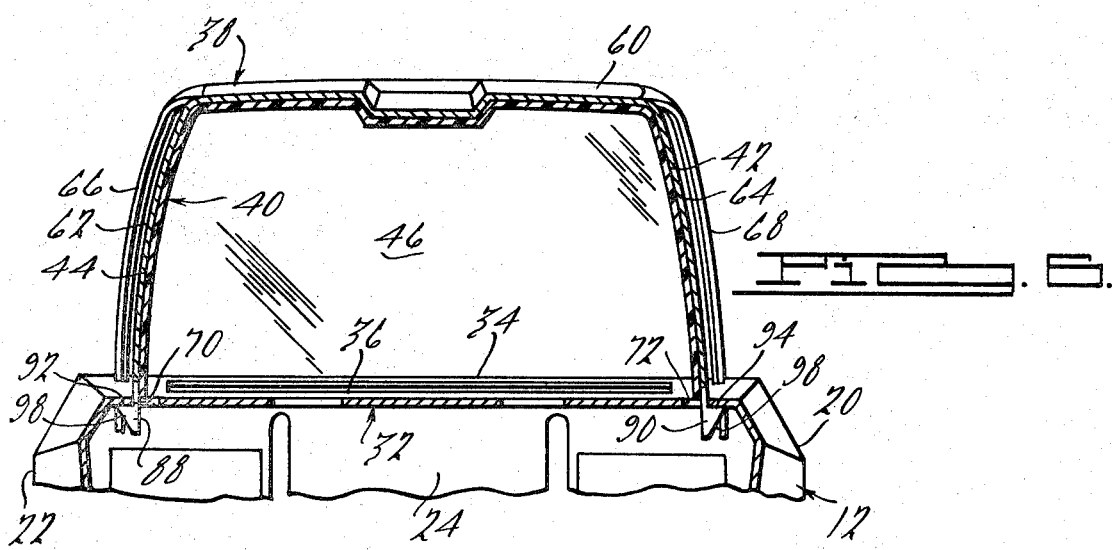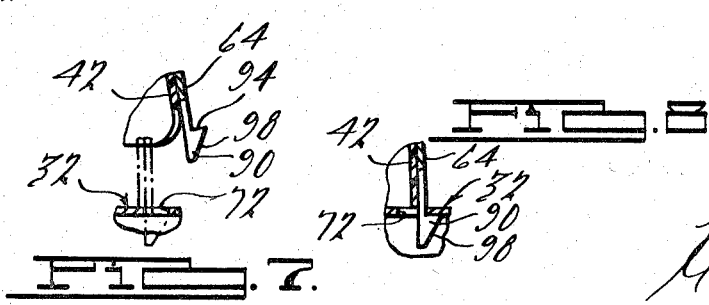

United States Patent Office 3,553,887
Patented Jan. 12, 1971

3,553,887
TOY VEHICLE WINDOW CONSTRUCTION
Robert S. Linstead, Rockford, Ill., assignor to King-Seeley Thermos Co., Ann Arbor, Mich., a corporation of Delaware
Filed Jan. 17, 1969, Ser. No. 792,086
Int. Cl. A63h 17/26
U.S. Cl. 46—223
15 Claims

ABSTRACT OF THE DISCLOSURE

A toy vehicle comprising, a chassis member defining a relatively flat horizontally extending deck, the deck being provided with front and rear pairs of transversely spaced and aligned slots; a one-piece window element fabricated of a relatively transparent material and including transversely spaced upright side portions providing opposed side window panes and front and rear portions providing a windshield and a rear window pane, and a top member including a roof overlying the element and having front and rear pairs of pillars depending downwardly adjacent the forward and rearward ends of the element and arranged in general correspondence with the slots, the lower ends of one of the pair of pillars being spaced transversely outwardly from their associated pair of slots and having hook-shaped fastening means on the lower ends thereof, the window element having one transverse portion thereof of a relatively flexible compressible construction and of a greater transverse dimension than the transverse dimension that the transverse spacing between one of the pair of slots.

BACKGROUND OF THE INVENTION

In the design and manufacture of toy vehicles, such as toy trucks, cars and the like, it is desirable to preassemble as many components of the vehicle as possible and run this preassembly through a single painting operation, rather than successively subjecting the various subcomponents to separate painting operations. In situations wherein unpainted components utimately appear in a final assembly, it is highly desirable that the structure be such as to lend itself to the addition of such unpainted components after the painting process is completed. This is particularly true in the case of a windshield or combination multi-window elements which must be added to the assembly subsequent to the painting operation since, if preassembled, would be painted along with the rest of the vehicle unless expensive and time consuming masking operations were performed on the windshield or equivalent part preparatory to the painting operation.

Although it has been known in the prior art to provide a toy vehicle with a cab or top member which may be preassembled and painted prior to installation of a multi-window element, for example in U.S. Pat. No. 3,083,501, issued Apr. 2, 1963 for Cab and Like Structure For Toy Vehicles, such heretofore known constructions having been objectionable from the standpoint that the cab or top members thereof, under certain circumstances may, at some time subsequent to final assembly, become inadvertently disassembled or separated from the vehicle chassis. Generally speaking, the present invention is directed toward a new and improved toy vehicle of the above described character which is designed to minimize to the extreme the possibility of such in advertent separation of the window element and/or cab from the vehicle chassis. More particularly, the toy vehicle of the present invention is characterized by the provision of a multi-window element and an associated top member having a roof portion adapted to overlie the window element and a plurality of pillar members extending downwardly from the roof in generally confining relationship with respect to the window element. The associated vehicle chassis is provided with a plurality of slotted apertures which are adapted to receive the lower ends of the pillars to fixedly secure the top member and the window element to the chassis. In accordance with the present invention, the window element is fabricated of a relatively flexible compressible material and is dimensioned such that when the lower ends of the pillars are inserted in the aforesaid apertures, the window element is maintained under a state of compression and thereby exerts outwardly directed forces against the interior side of the pillars to assure that the lower ends thereof are lockingly engaged within the slots. As will be described in detail, this design provides a construction which not only permits ease of manufacture and assembly, but which positively assures against inadvertent disassembly or separation of the top member and window element from the associated vehicle chassis so as to enable the toy vehicle to have a long, effective and durable operational life.

SUMMARY OF THE INVENTION

This invention relates generally to toy vehicles, and more particularly, concerns the construction of a vehicle cab or roof and associated multi-window element, and the means for mounting the same on the vehicle chassis.

It is accordingly a general object of the present invention to provide a new and improved toy vehicle.

It is a more particular object of the present invention to provide a toy vehicle including a cab or roof member and a multi-window element associated with the roof member, and which is characterized by a new and improved construction for operatively securing the roof member and window element to the vehicle chassis.

It is a further object of the present invention to provide a toy vehicle construction of the above character wherein the vehicle windshield element is positively secured to the vehicle chassis when the associated roof member is mounted thereon.

It is another object of the present invention to provide a toy vehicle of the above character wherein the roof member may be preassembled for purposes of painting, yet will allow the insertion of the window element between the roof member and vehicle chassis during a final assembly operation.

It is another object of the present invention to provide a new and improved toy vehicle of the above character wherein the window element is of a relatively flexible compressible construction and is adapted to exert a transversely outwardly directed force against portions of the roof member for effecting positive engagement thereof with the vehicle chassis.

It is a related object of the present invention to provide a toy vehicle of the above described type wherein the window element is maintained under a state of compression by the associated roof member, whereby the window element exerts a continuous locking force against the roof member.

It is still another object of the present invention to provide a toy vehicle of the above type wherein the roof member is provided with a plurality of downwardly depending pillars having connecting portions at the lower end thereof, which connecting portions are adapted to be lockingly received within a plurality of vertically opening slots in the chassis member, and wherein the window element functions to exert outwardly directed forces against the pillars to provide a smooth contiguous engagement thereof with the transversely outer edges of the slots so as to enhance the appearance of the vehicle.

It is a further object of the present invention to provide a new and improved toy vehicle which is of a relatively simple design, is easy to assemble and economical to commercially manufacture.

Other objects and advantages of the present invention will become apparent from the following detailed description taken in conjunction with the accompanying drawings.

BRIEF DESCRIPTION OF THE DRAWINGS

FIG. 1 is a side elevational view of a toy vehicle embodying the principles of the present invention;

FIG. 2 is an exploded perspective view of the chassis member, top and window element of the toy vehicle illustrated in FIG. 1;

FIG. 3 is an enlarged fragmentary perspective view of a portion of the top member illustrated within the circle 3 of FIG. 2;

FIG. 4 is an enlarged fragmentary perspective view of the portion of the top member designated by the arrow 4 of FIG. 2;

FIG. 5 is an enlarged transverse cross-sectional view of a portion of the toy vehicle illustrated in FIG. 1, showing the relative positions of the chassis member, top, and window element prior to asembly thereof;

FIG. 6 is a cross-sectional view similar to FIG. 5 and illustrates the various positions in which the chassis member, top and window element assume after assembly thereof;

FIG. 7 is a fragmentary cross-sectional view of a portion of the deck structure and one of the front roof pillars of the top vehicle shown in FIG. 1, and illustrates the relative positions thereof prior to final assembly; and FIG. 8 is a fragmentary cross-sectional view similar to FIG. 7 and illustrates the relative positions of the front roof pillar and deck structure after final assembly thereof.

DETAILED DESCRIPTION OF A PREFERRED EMBODIMENT

For purposes of clarity, the terms "inwardly," "outwardly" and derivatives thereof will have reference to the geometric center of the toy vehicle of the present invention and the various component parts thereof. Similarly, the terms "forwardly," "rearwardly" and the like will have reference to the toy vehicle of the present invention and the component parts thereof shown in FIGS. 1 and 2, with the forward end of the vehicle being located at the left side of these figures and the rearward end thereof being located at the right side thereof.

It will be noted that although the toy vehicle of the present invention is illustrated and described herein as being in the form of a toy pickup truck, the principles of the present invention are not intended to be in any way limited to this particular type of vehicle since these principles will also have particularly useful application in various other types of toy vehicles, such as toy passenger cars, construction and military vehicles and the like.

Referring now in detail to FIGS. 1 and 2 of the drawings, a toy vehicle 10, in accordance with a preferred embodiment of the present invention, is shown as generally comprising a vehicle chassis member 12 having a rearwardly extending portion 14 shown in phantom lines and defining a cargo carrying bed or enclosure. The vehicle 10 is shown by way of illustration as being carried on front and rear wheels 16 and 18 which may be mounted in any suitable manner upon the chassis member 12 and cargo bed 14, as will be apparent.

As best illustrated in FIG. 2, the chassis member 12 comprises side panels 20 and 22 which constitute the front fenders and side doors of the vehicle 10. The chassis member 12 also comprises a transversely extending, generally vertically disposed section or bulkhead 24 at the rearward end thereof and a transversely, generally vertically disposed flange section 26 at the forward end thereof. The chassis section 24 may be of any suitable construction adapted to cooperate with the cargo bed structure 14, and the flange section 26 may be provided with a suitable slotted aperture 28 adapted to cooperate with and support a front bumper and grill assembly, generally designated by the numeral 30 and shown in phantom lines in FIG. 1. The uppermost portions of the side panels 20, 22, bulkhead 24 and flange 26 terminate in and are integrally connected to a generally horizontally extending deck structure indicated in its entirety by the numeral 32. The deck structure 32 defines a horizontally extending support surface 34 and is formed with a central, generally rectangularly-shaped opening 36 which may, for example, constitute the operator's compartment of the vehicle 10 and be provided with a suitable seat structure, steering wheel, instrument panel and the like, as is well known in the art.

The vehicle 10, when completely assembled, is provided with a top member, generally designated by the numeral 38, and with multi-window element, generally designated 40, which is adapted to be sandwiched between the deck structure 32 and top member 38, whereby to enclose the operator's compartment of the vehicle 10. In general, it is in the manner of assembly and the completed relationship between the top member 38, window element 40 and deck structure 32 that the novel features of the present invention reside, which features will become apparent from the following description of the construction and operation of the deck structure 32, top member 38 and window element 40.

The window element 40 is fabricated of a relatively transparent material, preferably styrene plastic or the like, so as to be relatively flexible and compressible in the transverse direction, for reasons later to be described. The element 40 consists of a pair of transversely spaced upright side sectons 42 and 44 and with an upright, transversely extending rear side 46. The window element 40 further comprises a transversely extending upwardly and rearwardly inclined forward side section 48 which is connected at its opposite ends to the forward ends of the side sections 42, 44. The upper edge of the forward side section 48 is formed with a downwardly projecting notched portion 50 which is adapted to nestingly receive a downwardly projecting flange section 52 formed on the forward end of the top member 38. The forward side section 48, may, if desired, have windshield wiper appearing embossments 54 and 56 molded adjacent the lower edge thereof to enhance the realistic appearance of the window element 40, as will be apparent. The lower edge of the element 40 preferably lies along a flat, generally horizontal plane, whereby when the element 40 is juxtapositioned upon the support surface 34, the lower edge of the element 40 is contiguously engaged therewith. In a preferred construction of the present invention, the top of the element 40 is formed with a generally rectangular-shaped opening 58 which is closed by the top member 38 upon assembly thereof, as will be described.

The top member 38 generally comprises a flat horizontally extending roof portion 60 adapted to cover and close the opening 58 and having integrally formed thereon a pair of downwardly depending forward support pillars 62 and 64 and a pair of downwardly depending rearward support pillars 66 and 68. In a preferred construction, the forward pillars 62, 64 are somewhat flexible in the transverse direction, for purposes later to be described. Generally speaking, the top member 38 is adapted to be surmounted over the window element 40, with the forward pillars 62, 64 extending downwardly adjacent the laterally outer edges of the forward side section 48 and the rearward pillars 66, 68 extending downwardly adjacent the laterally outer edges of the rearward side section 46 of the element 40. As will be apparent, the forward and rearward pillars 64, 68 and 62, 66 are spaced longitudinally apart a sufficient distance so that the side sections 42, 44 of the element 40 will appear as opposed side window panes. Similarly, the forward pillars 62, 64 and the rearward pillars 66, 68 are spaced transversely apart so as to define with the window element 40 a windshield on the forward side section 48 and a rear window pane on the rearward side section 46. The rearward pillars 66, 68 may be and preferably are of a generally arcuate configuration so as to extend around and embrace the rearward corners of the window element 40.

When the top member 38 is assembled or surmounted over the window element 40, the lower or free ends of the support pillars 62, 64, 66 and 68 depend downwardly from the lower edge of the window element 40. Generally speaking, these lower or free end portions of the pillars 62–68 define fastening portions which are adapted to be inserted through and received within a plurality of slotted apertures formed in the deck structure 32. More particularly, the forward pillars 62, 64 are adapted to be inserted through and operatively engaged with a pair of forwardly disposed, transversely spaced slotted apertures 70 and 72, respectively, and the lower or free ends of the rearward support pillars 66, 68 are adapted to be inserted within and engaged with a pair of rearwardly disposed transversely spaced slotted apertures 74 and 76, respectively. As illustrated in FIG. 2, the apertures 70–76 are vertically opening with the forward and rearward pairs 70, 72 and 74, 76, thereof, being substantially longitudinally aligned with one another.

Referring now in detail to the fastening means provided on the rearward support pillars 66, 68, as best seen in FIGS. 2 and 3, such means is provided in the form of a pair of longitudinally extending transversely spaced, generally planar shaped tab portions 78 and 80 which are integrally formed on the lower ends of the pillars 66, 68, respectively. The rearward edges of the tab portions 78, 80 are formed with rearwardly opening, transversely aligned notches 82 and 84, respectively, which are generally tapered at an angle, for example, of approximately 15° (see FIG. 3). The longitudinal dimension of the tab portions 78, 80 is designed to be slightly smaller than the lengths of the slots 74, 76, whereby the tab portions 78, 80 may be inserted downwardly into said slots 74, 76. The forward edges of the pillars 66, 68 are formed with generally horizontally disposed, forwardly extending shoulder portions, generally designated 86, which afford a downward stop upon engagement thereof with the surface 34 of the deck structure 32 as the tab portions 78, 80 are inserted into the slots 74, 76, respectively. The shoulder portions 86 are spaced slightly vertically above the notches 82, 84, and the notches 82, 84 are of sufficient vertical height so that when the pillars 66, 68 are inserted into the slots 74, 76 to a position wherein the shoulder portions 86 engage the support surface 34, the notches 82, 84 are adapted to nestingly receive the portions of the deck structure 32 adjacent the rearward ends of the slots 74, 76. With the pillars 66, 68 thus connected to the deck structure 32, the top member 38 is adapted for pivotal movement about a transverse axis extending through the tab portions 78, 80. Such pivotal movement of the top member 38 relative to the chassis member 12 is designed to permit the member 38 to be pivoted upwardly so that during a painting operation the interior or underside of the member 38 is readily exposed and thus may be conveniently painted without disengagement thereof from the chassis 12. A further function of the above pivotal top member 38 and chassis 12 resides in the fact that the member 38 may be tilted upwardly to permit the installation of the window element 40 without requiring disconnection or disassembly of the top member 38 from the chassis 12. Consequently, the entire chassis member 12 and top member 38 can be painted, and thereafter the window element 40 may be inserted between the member 38 and the deck structure 32 without requiring that the window element 40 be masked to prevent any paint from being applied thereto.

The forward pillars 62, 64 are similarly provided with fastening means in the form of a pair of downwardly projecting tab portions 88 and 90, respectively, which are adapted to be inserted through the slots 70, 72, respectively, for securing the forward end of the top member 38 to the chassis 12. More particularly and as best seen in FIGS. 2 and 4, the tab portions 88, 90 are formed with laterally outwardly projecting, generally horizontally disposed shoulders 92 and 94, respectively, which terminate at their laterally outermost edges in generally downwardly and laterally inwardly inclined camming face portions 96 and 98, which results in the tab portions 88, 90 being generally wedge-shaped when the top member 38 is viewed from the forward side thereof (see FIGS. 5 and 6). Generally speaking, upon assembly of the vehicle 10, the rearward tab portions 78, 80 are inserted into the rearward pair of slots 74, 76, thereafter, the entire chassis 12 and top member 38 are subjected to a painting operation. The top member 38 is then biased to a position wherein the window element 40 may be inserted or sandwiched between the lower side of the roof section 60 and the support surface 34 defined by the deck structure 32. After the element 40 is properly inserted, the forward end of the top member 38 is pivoted downwardly and the forward tab portions 88, 90 are inserted through the forward pair of slots 70, 72 in order to fixedly secure the top member 38 and window element 40 in their respective operative positions shown in FIGS. 1 and 6.

In accordance with the principles of the present invention, the window element 40 is constructed and dimensioned so as to coact with the top member 38 in positively securing the support pillars 62, 64, 66 and 68 in their respective operatively engaged positions with the deck structure 32. More particularly, the window element 40 and top member 38 are designed such that the lateral or transverse width thereof, at a position longitudinally aligned with the forward slots 70, 72, is slightly greater than the transverse spacing between the slots 70, 72. Thus, prior to the lower ends of the pillars 62, 64 being connected to the chassis 12, the tab portions 88, 90 are disposed slightly laterally outboard of the slots 70, 72, respectively. Accordingly, in order to effect insertion of the tab portions 88, 90 into the slots 70, 72, it is necessary to compress or flex the pillars 62, 64 and side sections 42, 44 laterally inwardly until the tab portions 88, 90 are vertically aligned with the slots 70, 72. Thereafter, the forward end of the top member 38 may be biased downwardly, whereby the tab portions 88, 90 will be inserted into the slots 70, 72. In accordance with the principles of the present invention, the above construction serves a twofold purpose in the mounting of the top member 38 and window element 40 in their respective positions upon the chassis 12. First of all, because the window element 40 must be compressed laterally inwardly in order to transversely align the pillars 62, 64 with their respective slots 70, 72, the element 40 is maintained under a state of compression when it is operatively mounted upon the chassis 12 and hence continuously exerts laterally outwardly directed forces against the pillars 62, 64 so that the fastening means, i.e., tab portions 88, 90, on the lower ends thereof are firmly engaged with the portions of the deck structure 32 adjacent the slots 70, 72. Thus, the window element 40 acts to assure that the lower ends of the pillars 62–68 are positively engaged with the chassis 12 so as to prevent inadvertent separation or disassembly of the top member 38 and window element 40 therefrom. Secondly, the above described design functions to enhance the outside appearance of the toy vehicle 10 embodying the present invention. More particularly, by virtue of the fact that the window element 40 exerts the aforesaid outwardly directed forces against the interior or laterally inner sides of the pillars 62, 64 and hence functions to urge the lower ends of these pillars laterally outwardly, at such time as the top member 38 is operatively mounted on the chassis 12, the lower ends of the pillars 62–68 will be biased laterally outwardly into contiguous engagement with the laterally outer sides of the slots 70, 72. Accordingly, there will be a minimum amount of exterior separation or cracks between the laterally outer sides of the lower ends of the pillars 62, 64 and the laterally outer sides of the slots 70, 72 so that a smooth continuous surface is provided at the juncture of the top member 38 and chassis 12. This, of course, will minimize the possibility of dirt and other foreign material accumulating between the exterior of the support pillars 62, 64 and the adjacent portions of the slots 70–76, whereby the vehicle 10 will not only be pleasant in appearance, but will also have an exterior surface which is devoid of any undesirable openings between the various assembled component parts thereof.

In assembly, the top member 38 is positioned relative to the chassis 12 such that the tab portions 78, 80 are disposed vertically above the slots 74, 76, respectively. Thereafter, the top member 38 is biased downwardly, whereby the tab portions 78, 80 are inserted into the slots 74, 76 to a position wherein the shoulders 86 engage the support surface 34. The top member 38 is then biased rearwardly, whereby the portions of the deck structure immediately rearwardly of the slots 74, 76 will be received within the notches 82, 84. The chassis 12 and top member 38 may be then subjected to a painting operation, as above described. Upon completion of the painting operation, the forward end of the top member 38 may be pivoted away from the support surface 34 a sufficient amount to permit insertion of the window element 40 between the roof portion 60 of the top member 38 and the support surface 34, after which time the forward end of the top member 38 is pivoted downwardly to a position wherein the tab portions 88, 90 are adjacent the forward pair of transversely spaced slots 70, 72, respectively. The forward pillars 62, 64 of the top member 38 and side sections 44 and 42 of the window element 40 are then flexed or compressed laterally inwardly a sufficient amount to vertically align the tab portions 88, 90 with the slots 70, 72. After this has been done, the forward end of the top member 38 is then biased downwardly, whereby the tab portions 88, 90 will be inserted through the slots 70, 72. The downwardly and laterally and inwardly inclined camming face portions 98, assist in guiding the tab portions 88, 90 through the slots 70, 72. After the tab portions 88, 90 have been inserted through the slots 70, 72 to a position wherein the shoulders 92, 94 are disposed below the lower side of the deck structure 32, the pillars 62, 64 may be released, with the result that the window element 40 will resiliently bias the lower ends of the pillars 62, 64 laterally outwardly to a position wherein the laterally outwardly sides of the pillars 62, 64 contiguously engage the laterally outer sides of the slots 70, 72. In this position, the shoulders 92, 94 will underlie the portions of the deck structure 32 directly laterally outwardly from the slots 70, 72 to prevent upward movement of the forward end of the top member 38 relative to the chassis 12. As previously described, the relative size of the window element 40 and the position of the slots 70, 72 with respect thereto results in the element 40 being maintained under a slight state of compression so that the pillars 62, 64 are continuously urged outwardly and are thus positively engaged with the chassis 12 to prevent separation of the top member 38 and window element 40 therefrom.

It will be seen from the above description that the present invention provides a novel toy vehicle which is characterized by a construction wherein the top member thereof is positively secured to the associated vehicle chassis. In particular, by properly dimensioning the associated window element with respect to the slots in the chassis 12 which function to receive the support pillars of the top member, the tab portions provided on the lower ends of the pillars will be fixedly secured to the chassis, while at the same time, the vehicle will be seen to have a pleasant appearance since the pillars are urged into contiguous engagement with the laterally outer sides of the slots to prevent any dirt or other foreign material from accumulating therein. Accordingly, the toy vehicle of the present invention will have a pleasant appearance and will have a long and durable operational life.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:
1. In a toy vehicle,
a chassis member defining a relatively flat horizontally extending deck,
said deck being provided with front and rear pairs of transversely spaced and longitudinally aligned vertically opening slots,
a one-piece window element fabricated of a relatively transparent material and including transversely spaced upright side portions providing opposed side window panes and front and rear end portions providing a windshield and a rear window pane,
the lower end of said element being generally contiguously engaged with the upper side of said deck, and
a top member including a roof overlying said element and having front and rear pairs of pillars depending downwardly adjacent the front and rear portions of said element and arranged in general correspondence with said slots,
the lower ends of said front pair of pillars being spaced transversely outwardly from their associated pair of slots and having fastening means on the lower ends thereof,
said window element having one transverse end portion thereof of a relatively flexible compressible construction and of a greater transverse dimension than the transverse spacing between said associated pair of slots, whereby
said front pair of pillars may be distorted transversely inwardly into alignment with said associated pair of slots and thereby compress said one end portion of said element so that said fastening means on said front pair of pillars may be inserted downwardly into said associated pair of slots and be positively maintained in engagement with the adjacent portions of said deck by outwardly directed forces exerted by said compressed portion of said element against the interior sides of said front pair of pillars.

2. In a toy vehicle as defined in claim 1 which includes means for pivotably connecting rear pair of said pillars to said chassis member, whereby said top member is pivotable about a transverse axis to and from a position permitting said window element to be inserted between said top member and said chassis member.

3. In a toy vehicle as defined in claim 2 wherein said rear pair of pillars on said top member are provided with notched portions adapted to engage the associated pair of slots in said deck for pivotably connecting said top member to said chassis member for said pivotal movement.

4. In a toy vehicle as defined in claim 3 wherein said rear pair of pillars are formed with longitudinally extending recessed portions adapted to nestingly receive portions of said deck adjacent said rearward pair of slots.

5. In a toy vehicle as defined in claim 1 wherein said front pair of pillars is formed with transversely projecting shoulder portions on the lower ends thereof, said shoulder portions being insertable through the associated pair of slots formed in said deck and adapted to engage the underside of said deck adjacent said associated pair of slots.

6. In a toy vehicle as defined in claim 5 wherein the transverse width of each of said slots of said associated pair thereof is slightly greater than the overall transverse width of said front pair of pillars and said shoulder portions thereon, and wherein said one-piece element is dimensioned so as to exert sufficient outwardly directed forces against the interior sides of said front pair of pillars so as to force said front pair of pillars transversely outwardly to a position wherein the exterior sides thereof are contiguously engaged with the outermost sides of said associated pair of slots.

7. In a toy vehicle as defined in claim 1 wherein said rear pair of pillars are formed with longitudinally extending recessed portions adapted to nestingly receive portions of said deck adjacent said rearward pair of slots, wherein said front pair of pillars are formed with transversely projecting shoulder portions on the lower ends thereof, said shoulder portions being insertable through the forward pair of slots formed in said deck and adapted to engage the underside of said deck adjacent said associated pair of slots, the transverse width of each of said front slots being slightly greater than the overall transverse width of said front pair of pillars and said shoulder portions thereon, and wherein said window element is dimensioned so as to exert sufficient outwardly directed forces against the interior sides of said front pair of pillars so as to force the same transversely outwardly to a position wherein the exterior sides thereof are contiguously engaged with the outermost sides of said forward pair of slots.

8. In a toy vehicle as defined in claim 1 wherein said window element defines a central opening in the upper end thereof which is bounded by said side portions, rear window pane and said windshield, and wherein said roof of said top member is coextensive of and closes said central opening.

9. In a toy vehicle,
a chassis member defining a relatively flat horizontally extending deck,
said deck being provided with front and rear pairs of transversely spaced and longitudinally aligned vertically opening slots,
a top member including a roof overlying and spaced above said deck and having front and rear pairs of pillars connected to and depending downwardly therefrom and arranged in general correspondence with said slots,
each of said pillars having fastening means on the lower end thereof adapted to enter its respective opening slot and hook under the adjacent portion of said deck, and
a one-piece window element fabricated of a relatively transparent material and including transversely spaced upright side portions providing opposed side window panes and front and rear end portions providing a windshield and a rear window pane, respectively,
said window element being disposed between the upper side of said deck and the underside of said roof with said pillars arranged in generally confining relationship thereto,
said element further being of a relatively flexible compressible construction and dimensioned with one end portion of a greater length than the associated slots, so as to be maintained under a state of compression by said top member and thereby exert an outwardly directed force against one pair of said pillars to assure positive engagement of said fastening means thereon with said deck.

10. In a toy vehicle as defined in claim 9 wherein said rear pair of pillars on said top member are provided with notched portions adapted to engage the associated pair of slots in said deck for pivotably connecting said top member to said chassis member for pivotal movement about a transverse axis extending through the lower ends of said one pair of pillars.

11. In a toy vehicle as defined in claim 9 wherein said front pair of pillars is formed with transversely projecting shoulder portions on the lower ends thereof, said shoulder portions being insertable through the associated pair of slots formed in said deck and adapted to engage the underside of said deck adjacent said associated pair of slots.

12. In a toy vehicle as defined in claim 11 wherein the transverse width of said front pair of slots is slightly less than the overall transverse width of said front pair of pillars and said shoulder portions thereon, and wherein said window element is dimensioned so as to exert sufficient outwardly directed forces against the interior sides of said one pair of pillars so as to force the same transversely outwardly to a position wherein the exterior sides thereof are contiguously engaged with the outermost sides of said associated pair of slots.

13. In a toy vehicle as defined in claim 9 wherein said rear pair of pillars are formed with longitudinally extending recessed portions adapted to nestingly receive portions of said deck adjacent said rearward pair of slots, wherein said forward pair of pillars are formed with transversely projecting shoulder portions on the lower ends thereof, said shoulder portions being insertable through said forward pair of slots formed in said deck and adapted to engage the underside of said deck adjacent said pair of slots, wherein the transverse width of said forward pair of slots is slightly less than the overall transverse width of said forward pair of pillars and said shoulder portions thereon, and wherein said window element is dimensioned so as to exert sufficient outwardly directed forces against the interior sides of said forward pair of pillars so as to force the same transversely outwardly to a position wherein the exterior sides thereof are contiguously engaged with the outermost sides of said forward pair of slots.

14. In combination in a toy vehicle,
a body member having means thereon defining a pair of recessed portions on the upper side thereof spaced a predetermined transverse distance apart,
a window element adapted to be mounted on said body member and comprising a pair of transversely spaced upright side window sections,
said window element being laterally distortable in a manner such that said window sections are movable laterally toward and away from one another, and
a top member including a portion overlying at least part of said window element and having a pair of downwardly depending laterally deformable attachment portions adapted to be engaged with said body member,
the lower ends of said attachment portions and said window sections being spaced apart a distance greater than the transverse spacing between said recessed portions prior to assembly of said window element and said top member on said body member, with said attachment portions and said window sections being laterally deformable to positions wherein said window element is laterally compressed and said lower ends of said attachment portions are laterally aligned with said recessed areas and are maintained in engagement therewith by laterally outwardly directed forces exerted against said attachment portions by said window element.

15. In the method of assembling a toy vehicle comprising a body member having means thereon defining a pair of recessed portions on the upper side thereof spaced a predetermined transverse distance apart, a window element adapted to be mounted on the body member and comprising a pair of transversely spaced, upright side window sections, the window element being laterally distortable in a manner such that the window sections are movable laterally toward and away from one another, and a top member including a portion overlying at least part of the window element and having a pair of downwardly depending laterally deformable attachment portions adapted to be engaged with the body member, the lower ends of said attachment portions and said window sections being spaced apart a distance greater than the transverse spacing between said recessed portion, the steps which include,
  laterally deforming the lower ends of said attachment portions into lateral alignment with said recessed areas and simultaneously laterally compressing said window sections,
  engaging said lower ends of said attachment portions with said recessed areas, and
  maintaining said lower end portions of said attachment portions engaged with said recessed areas by exerting laterally outwardly directed forces against said attachment portions with said window element.

References Cited

UNITED STATES PATENTS

| | | | |
|---|---|---|---|
| 3,009,288 | 11/1961 | Klamer | 46—223 |
| 3,083,501 | 4/1963 | Balthazor | 46—223 |

FOREIGN PATENTS

| | | | |
|---|---|---|---|
| 1,134,617 | 8/1962 | Germany | 46—223 |

LOUIS G. MANCENE, Primary Examiner

J. N. ESKOVITZ, Assistant Examiner

U.S. Cl. X.R.

46—17